US006272853B1

(12) United States Patent
Broechmann

(10) Patent No.: US 6,272,853 B1
(45) Date of Patent: Aug. 14, 2001

(54) HYDRAULIC LIFTING-LOWERING-SYSTEM FOR A WORKING TABLE, A COUCH OR LYING FURNITURE OR ANOTHER HEAVY OBJECT

(76) Inventor: Ole Flemming Broechmann, Stentevej 2, Vejby (DK), DK-3210

(*) Notice: Subject to any disclaimer, the term of this patent is extended or adjusted under 35 U.S.C. 154(b) by 0 days.

(21) Appl. No.: 09/142,827

(22) PCT Filed: Mar. 17, 1996

(86) PCT No.: PCT/DK97/00117

§ 371 Date: Sep. 15, 1998

§ 102(e) Date: Sep. 15, 1998

(87) PCT Pub. No.: WO97/34513

PCT Pub. Date: Sep. 25, 1997

(30) Foreign Application Priority Data

Mar. 15, 1996 (DK) ..................................................... 300/96

(51) Int. Cl.[7] ........................................................ F16F 5/00

(52) U.S. Cl. .................................. 60/414; 91/169; 92/52; 248/162.1; 267/118

(58) Field of Search ............................ 60/414, 415; 91/5, 91/169; 92/52; 108/147; 248/162.1, 404; 267/113, 118

(56) References Cited

U.S. PATENT DOCUMENTS 3,168,278 * 2/1965 Ogden .................................. 248/542
3,436,048 * 4/1969 Greer .................................. 248/404
3,486,417 * 12/1969 Di Vita et al. ....................... 267/117
3,825,244 * 7/1974 Bauer .................................. 267/124
3,861,740 * 1/1975 Tajima et al. ........................ 248/404
3,865,341 * 2/1975 Fortnam et al. ..................... 248/404
4,415,135 * 11/1983 French .............................. 248/162.1

* cited by examiner

*Primary Examiner*—F. Daniel Lopez
(74) *Attorney, Agent, or Firm*—Antonelli, Terry, Stout & Kraus, LLP

(57) ABSTRACT

A hydraulic lifting-lowering-system for a working table, a couch or lying furniture or another heavy object allows the height level or position to be frequently adjusted or changed. The system includes a predetermined amount of hydraulic fluid, a hydraulic fluid accumulator, the fluid pressure of which on the hydraulic fluid side is adjustable, a single acting hydraulic cylinder with two end caps, a piston pressure chamber and a piston rod which, via a piston rod sealing ring, extends sealingly out through the one end cap of the cylinder. The piston pressure chamber is pressure fluid connected to the hydraulic fluid side of the accumulator. The hydraulic cylinder is of the plunger piston type, and the cylindric tube of the hydraulic cylinder is slideably and telescopically mounted in a cylindrical guiding tube, which surrounds the piston rod in its entire length and is rigidly secured to the one end of the piston rod via a cross plate or similar construction part. Thus, a simple, stable and reliable system is achieved without the need for crank handles, and by which new system the force applied from the plunger piston rod will be essentially constant in all positions of the piston rod at a given load, seeing that the operational manual force necessary for height adjustment of the heavy object becomes low.

15 Claims, 4 Drawing Sheets

Figure 1:
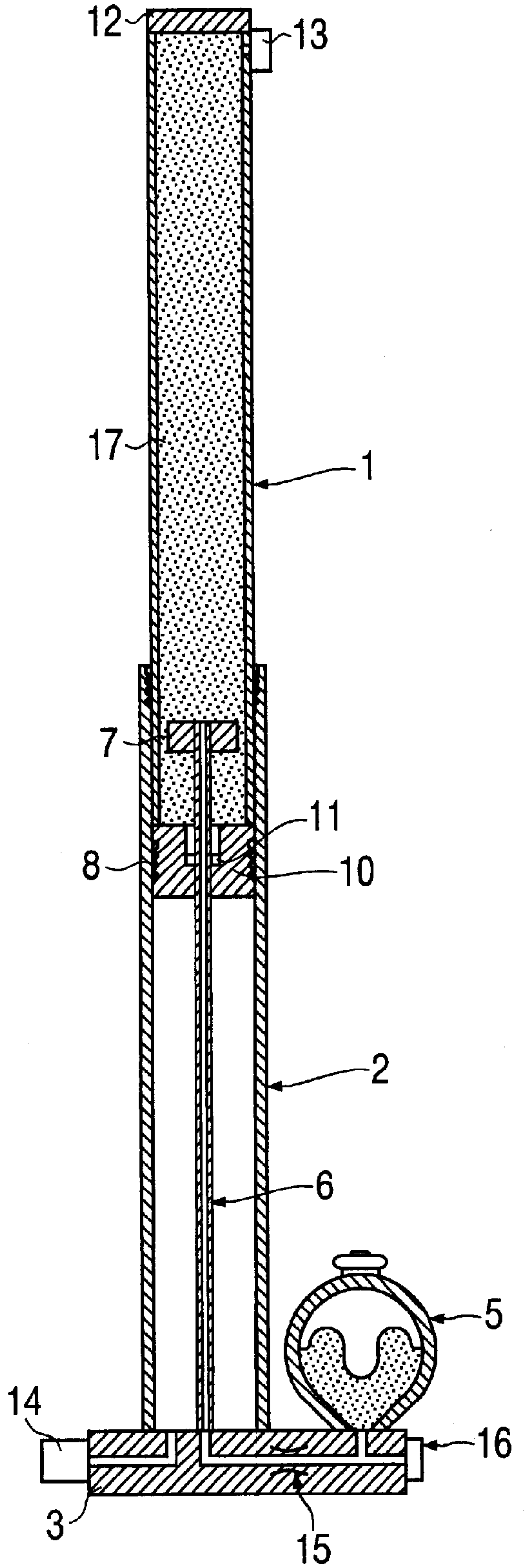

HYDRAULIC LIFTING-LOWERING-SYSTEM FOR A WORKING TABLE, A COUCH OR LYING FURNITURE OR ANOTHER HEAVY OBJECT

The invention relates to a hydraulic lifting-lowering-system for a working table, a couch or lying furniture or another heavy object, the height level of which it is frequently desired to adjust or change, and said system comprising a predetermined amount of hydraulic fluid, a hydraulic fluid accumulator, the fluid pressure of which on the hydraulic fluid side is adjustable, a single acting hydraulic cylinder with two end caps, a piston pressure chamber and a piston rod which via a piston rod sealing ring extends sealingly out through the one end cap of the cylinder.

Within the fields of chiropractics and physiotherapy it has lately been recommended to use such systems for avoiding overloading damages in the neck, the back and the shoulders, partly by avoiding heavy liftings and partly by changing the working position frequently and having the possibility to change freely between a sitting and standing position.

From DE-A- 30 21 559 is known such system in connection with a height adjustable hospital bed for reducing heavy liftings for the nursing personnel. This known system has a.o. the disadvantage that hand or foot activated pumping work should be done by all lifting operations for the bed.

From U.S. Pat. No. 4,037,811 is known a support for an instrument, whereby an instrument is balanced by a single acting hydraulic cylinder being connected to a hydraulic accumulator. One of the disadvantages by this arrangement is that the cylinder should have an expensive telescopic column 11, 15 of triangular cross section for guiding its rectilinear movement, whereby one telescopic part 11 is provided with a spring loaded pressure shoe 50 pressing the part 15 against the wall sides 52 of the part 11, cf. column 2, line 58 to column 3, line 4, said guiding system provides a mechanical friction which can be overcome by the gear transmission 25–28 by rotation of a crank handle.

Said disadvantages can be avoided by a hydraulic system according to the present invention, which is special by the combination that the hydraulic cylinder is of the plunger piston type and that the cylinder wall of the hydraulic cylinder is slidably and telescopically mounted in a cylindric guiding tube surrounding the piston rod in its entire length and being rigidly secured to the one end of the piston rod via a cross plate or similar construction part. Thus, beyond that the force of pressure applied at the end of the hydraulic cylinder at a given accumulator size is only changing a little over a relatively long stroke length, a very simple and stable and reliable system without handle is achieved. It has turned out that e.g. a working table being supported by such system, the operating pressure of which is pre-adjusted in accordance with the weight and load of the working table of e.g. 25 kg, and the stroke length of which is predetermined according to the desired height regulation range of the working table of e.g. 400 mm, only required a force corresponding to the force of the weight of about 200 g (1,96 N) vertically towards the table plate to change the height level of the table arbitrarily within the mentioned 400 mm.

This corresponds to a very little pressure change in the piston pressure chamber, namely 0.8%, such that the accumulator can be so selected that its operative pressure is altered 0.8–10% at the most, or even better: 1.0–2.5% at the most, during the relative stroke of the plunger piston rod from one to its other operative position of its predetermined stroke length, which stroke is relative to the hydraulic cylinder.

Preferably, the end caps of the hydraulic cylinder are connected via an inner telescopic tube carried telescopically in the cylindric guiding tube serving as an outer telescopic tube, which together with the plunger piston rod has been secured coaxially in a mounting block, and the outer telescopic tube via a slide bushing externally upon the inner telescopic tube at that end cap, through which the piston rod extends, together with a slide bushing in the outer end of the outer telescopic tube is adapted to guide the inner telescopic tube when it is displaced in the outer telescopic tube. An advantage connected thereto is that even though the operating pressure is rather high, typically 40–150 bar, a rugged and stable guiding can be achieved at low friction of the telescopic construction.

The plunger piston rod advantageously may comprise a longitudinal bore forming a part of the pressure fluid connection between the piston pressure chamber and the hydraulic fluid side of the accumulator.

The hydraulic fluid accumulator may e.g. be of the kind with a pressure fluid tight membrane separating the hydraulic fluid from a gaseous fluid serving as pneumatic spring. This permits the system to obtain very low friction losses in the accumulator and thus permits low manoeuvering forces for a user who desires to change said height adjustment. A possible adjustability of the gas pressure permits a change of the force of the supporting ability of the hydraulic cylinder.

The accumulator may also be of the spring type whereby a compression spring exerts a force on a piston in an accumulator cylinder. Thus is achieved an economic embodiment of the accumulator, and if the spring pressure is adjustable, a simple adjustment of the hydraulic pressure in the activator circuit is obtained by just tightening or slackening the compression spring.

An embodiment, by which the hydraulic fluid accumulator is of the spring type, and a compression spring exerts a force against a piston in an accumulator cylinder, is characterized in that the wall of the accumulator cylinder is formed by that part of the plunger cylinder wall which is situated between a stop ring and one end cap, whereby the piston is arranged also in the hydraulic cylinder and is fluid proof sealed and displaceable on the plunger piston rod between said stop ring on said piston rod and said end cap into which the piston rod is displaceably arranged.

Here the spring is thus fully built-in in the hydraulic cylinder, whereby a small outer diameter for the lifting-lowering-unit can be achieved at the expense of the fact that the spring should be dimensioned with the free length and spring characteristic demanded for the relevant and thus economical lifting-lowering-unit.

Figure 2:
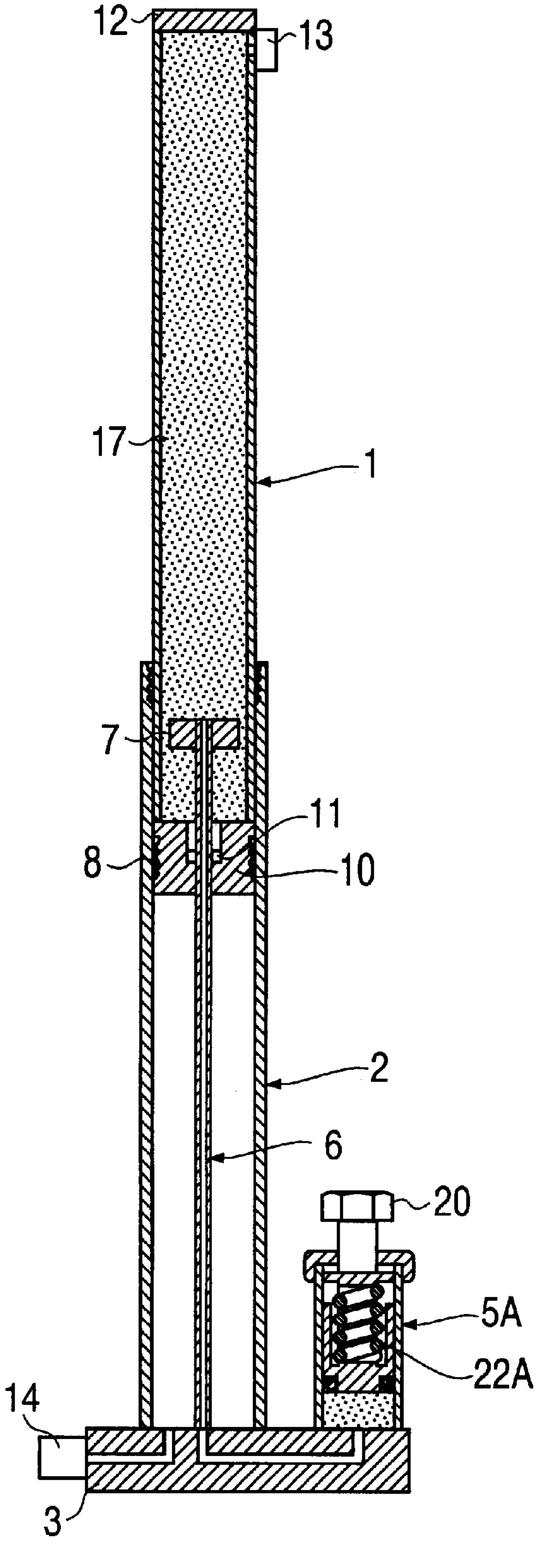
Figure 3:
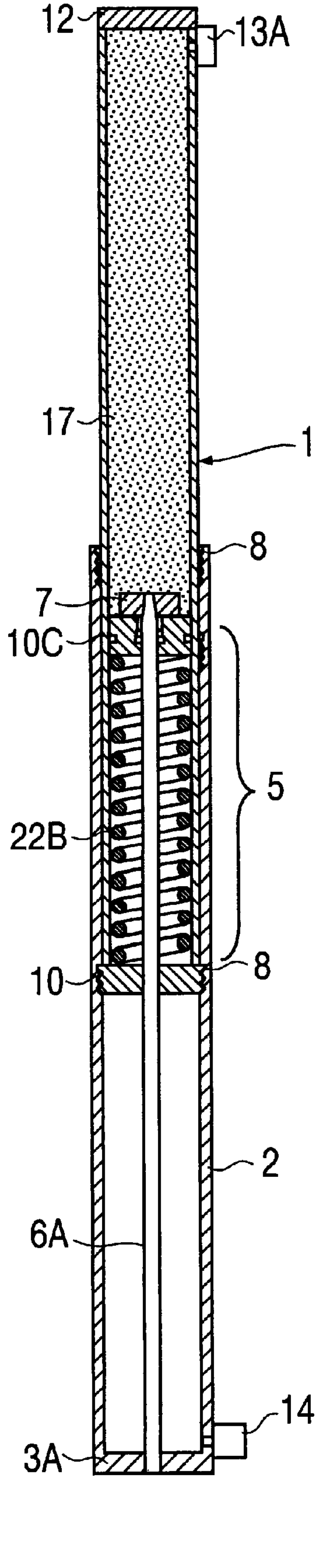
Figure 4:
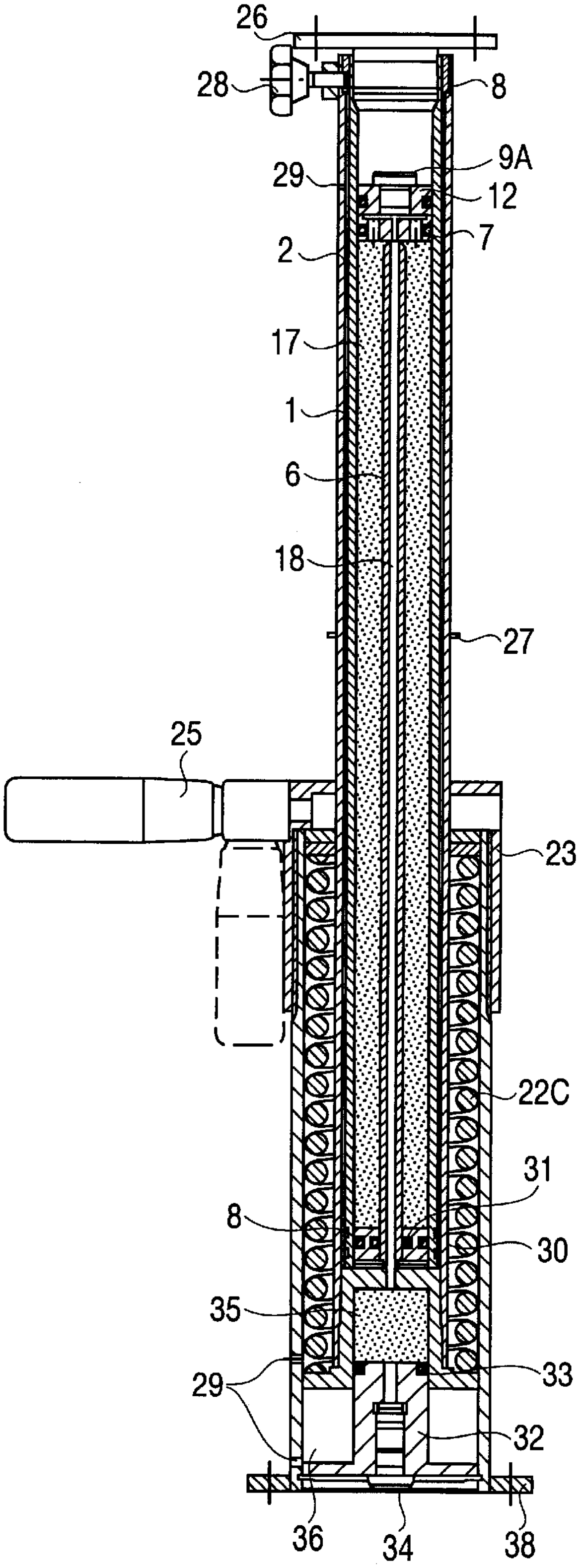
Figure 5:
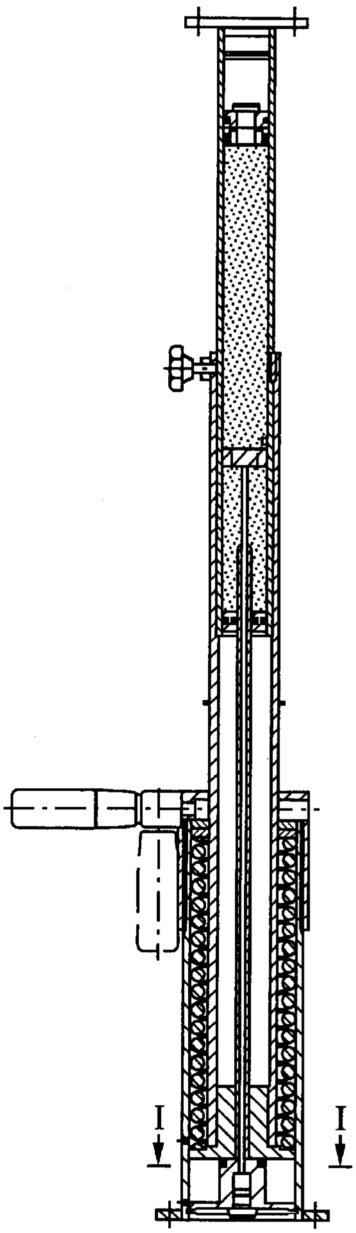
Figure 6:
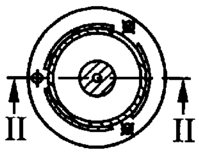

The hydraulic system according to the invention will now be described in more detail in connection with some embodiments and with reference to the drawing in which:

FIG. 1 shows a hydraulic system where the pressure for the lifting force of the plunger piston is maintained by a gas pressure membrane accumulator, and where the plunger piston rod is hollow, FIG. 2 the system shown in FIG. 1 with a compression spring accumulator instead of the membrane accumulator, FIG. 3 an embodiment with a compression spring accumulator integrated in the plunger cylinder, and wherein the plunger piston rod is solid, FIG. 4 an embodiment shown in one end position with a compression spring accumulator, the compression spring of which is arranged externally for its adjustment from outside with a handle, and where the plunger piston rod is hollow, FIG. 5 the embodiment of FIG. 4 in another end position and likewise in a section along II—II in FIG. 6, and FIG. 6 a section along I—I in FIG. 5.

FIG. 1 shows an inner telescopic tube 1, formed as a cylinder wall 1 in a hydraulic plunger cylinder 1, 6, 7, 10, 11, 12 and 17, said inner telescopic tube 1 being arranged in an outer telescopic tube 2 which in turn is secured in a mounting block 3. In said mounting block 3 is also arranged a pressure accumulator 5 of the membrane type, which in the embodiment shown is a gas pressure accumulator which against its membrane has a predetermined but possibly adjustable nitrogene pressure corresponding to the highest working pressure in the piston pressure chamber 17 of the cylinder. The plunger piston rod 6 in the plunger cylinder is in the embodiment shown provided with a stop ring 7 at its one end and is at its other end fastened coaxially in the mounting block 3. On the outer end of the outer telescopic tube 2 and on the inner end of the inner telescopic tube 1 is arranged slide bushings 8 so that the outer tube 2 may guide the inner tube 1.

The one end piece or cap 10 of the cylinder 1 with piston rod washer or sealing 11 and other end piece or cap 12 with bleeder valve 13 is connected via the inner telescopic tube 1.

On the mounting block 3 is arranged an air filter 14 for permitting the air from the inner of the tube 2 to escape or to be sucked in during the stroke of the plunger piston. In the mounting block is furthermore arranged a filling means 16 for hydraulic fluid under a predetermined pressure and possibly a quantity regulation valve 15 for adjustment of the flow rate between the accumulator 5 and the piston pressure chamber 17.

The plunger cylinder is formed by the inner tube 1, the plunger piston rod 6, the stop ring 7, the end caps 10 and 12 and the piston pressure chamber 17. The piston pressure chamber 17 is enclosed by the inner tube 1 and of the end pieces 10 and 12 and is connected to the accumulator 5 with respect to the flow by a tube system, here formed by a longitudinal bore 18 in the piston rod 6 and a connection channel in the mounting block, The stop ring 7 may also be used as guide ring by providing it externally with a slide bushing not shown, which is adapted to slide on the inner wall of the inner tube 1. In this case the stop ring 7 should be provided with axial flow openings or the channel 18 should have discharge openings to both sides of the stop ring 7 so that the pressure fluid is free to fill the chamber 17.

The working table is ready for use when a load, e.g. a working table with tools or other equipment, is supported by the unit shown in FIG. 1 resting on its mounting block 3 and being under a fluid pressure corresponding to the vertical load on the unit, where the pressure in the chamber 17 against the cross sectional area of the plunger piston rod, provides the unit with enough force to support the load.

The operator can begin his work, and if the working height or level of the table should be changed, the table may with a relatively small manual pulling or pushing force be moved upwards or downwards to a new working height without the trouble hitherto being connected to such constructions, which implied pumping operations, start and stop of electromotors or manual rotation of crank handles in order to change the working height of the table.

In FIG. 2 the hydraulic gas pressure accumulator has been replaced by a compression spring influenced hydraulic piston accumulator 5A which easily by means of an adjustment screw 20 may have amended the spring pressure of the compression spring 22A and thus the fluid pressure in the unit.

From FIG. 3 appears another unit with a hydraulic piston accumulator, the piston 10C forming an end cap for the piston pressure chamber 17, said cap being spring loaded by the accumulator spring 22B. The piston 10C is mounted slidably and as well sealed by sealings against the plunger piston rod 6A which is solid, as well as against the inner telescopic tube 1. This spring 22B of the piston accumulator is performed with a fixed free length and a certain spring characteristic which is adapted to the load and the height position range to which the unit of FIG. 3 should be exposed. The economy will be good by high piece numbers, but at the expense of adjustability of the unit.

In FIGS. 4–6 is used an accumulator arranged coaxially to the plunger cylinder in stead of the accumulator shown in FIG. 2. The spring 22C of said accumulator is so arranged outside and around the outer tube 2 that the pressure range can be adjusted by screwing a threaded bushing 23 to tightening or slackening of the spring 22C by means of a control lever 25. Furthermore, FIG. 4 shows a seeger circlip 27 for limitation of the setting range or setting movement, an upper supporting plate 26, a mechanical lock 28, an air bleeding and hydraulic fluid filling means 9A, three air bleeding holes 29, a stationary O-ring 30 and a dynamic sealing 31 in the end cap 10, a sliding sleeve or band 32, a dynamic sealing 33, a pressure regulating screw 34, an accumulating chamber 35 and a spring travel chamber 36, the air bleeding hole of which—along with the other air bleeding holes 29—may be provided with an air filter.

What is claimed is:

1. A hydraulic lifting-lowering-system for a heavy object, the height level or position of which it is frequently desired to adjust or change, the system comprising:

a piston rod having a longitudinal bore;

a cylindrical guiding tube surrounding the piston rod in its entire length and rigidly secured to the one end of the piston rod;

a single acting hydraulic cylinder with two end caps and a cylinder wall connecting the end caps to form a piston pressure chamber, the cylinder wall of the hydraulic cylinder being slidably and telescopically mounted in the cylindrical guiding tube, the piston rod forming a plunger piston rod by extending sealingly into the hydraulic cylinder through a sealing ring and one end cap of the cylinder;

a hydraulic fluid accumulator, the accumulator fluid pressure of which on the hydraulic fluid side of the accumulator is adjustable; and a predetermined amount of hydraulic fluid provided in the piston pressure chamber, the longitudinal bore of the piston rod, and the hydraulic fluid side of the accumulator, the longitudinal bore of the piston rod forming a part of the pressure fluid connection between the piston pressure chamber and the hydraulic fluid side of the accumulator.

2. The hydraulic lifting-lowering-system of claim 1, wherein the cylindrical guiding tube is rigidly secured to the one end of the piston rod by a cross plate.

3. The hydraulic lifting-lowering-system according to claim 2, wherein the piston rod is secured coaxially with the cylindrical guiding tube to the cross plate, a slide bushing being provided externally on the cylinder wall of the hydraulic cylinder at the one end cap, through which the piston rod extends, and a slide bushing being provided between an interior surface of an outer end of the cylindrical guiding tube and the cylinder wall of the hydraulic cylinder.

4. A combination of the hydraulic lifting-lowering-system of claim 1, and a lying furniture supporting by the hydraulic cylinder.

5. A combination of the hydraulic lifting-lowering-system of claim 1, and a table supported by the hydraulic cylinder.

6. A combination of the hydraulic lifting-lowering-system of claim 1, and a couch supported by the hydraulic cylinder.

7. The hydraulic lifting -lowering-system according to claim 1, wherein the hydraulic fluid fills the entire piston pressure chamber from the one end cap to another end cap.

8. The hydraulic lifting-lowering-system according to claim 7, wherein a pressure change in the piston pressure chamber over a full stroke of the hydraulic cylinder in the cylindrical guiding tube is 10% or less.

9. The hydraulic lifting-lowering-system according to claim 7, wherein a pressure change in the piston pressure chamber over a full stroke of the hydraulic cylinder in the cylindrical guiding tube is 1.0–2.5%.

10. A hydraulic lifting-lowering-system for a heavy object, the height level or position of which it is frequently desired to adjust or change, the system comprising:

a piston rod;

a cylindrical guiding tube surrounding the piston rod in its entire length and rigidly secured to the one end of the piston rod;

a single acting hydraulic cylinder with a pair of end caps and a cylinder wall connecting the pair of end caps, the cylinder wall of the hydraulic cylinder being slidably and telescopically mounted in the cylindrical guiding tube, a piston pressure chamber being formed between one of the pair of end caps and a piston, the piston rod forming a plunger piston rod by extending sealingly into the hydraulic cylinder through another of the pair of end caps and through a sealing ring in the piston;

a hydraulic fluid accumulator, a wall of the accumulator being formed by that part of the cylinder wall which is situated between a stop ring provided on the piston rod within the piston pressure chamber and the another of the pair of end caps, a compression spring being provided in the accumulator for exerting a force against the piston, wherein the piston is fluid proof sealed and displaceable on the plunger piston rod between the stop ring on the piston rod and the another of the pair of end caps into which the piston rod is displaceably arranged; and a predetermined amount of hydraulic fluid provided in the piston pressure chamber.

11. A combination of the hydraulic lifting-lowering-system of claim 10, and a lying furniture supporting by the hydraulic cylinder.

12. The hydraulic lifting-lowering-system according to claim 10, wherein a pressure change in the piston pressure chamber over a full stroke of the hydraulic cylinder in the cylindrical guiding tube is 10% or less.

13. The hydraulic lifting-lowering-system according to claim 10, wherein a pressure change in the piston pressure chamber over a full stroke of the hydraulic cylinder in the cylindrical guiding tube is 1.0–2.5%.

14. A combination of the hydraulic lifting-lowering-system of claim 10, and a table supported by the hydraulic cylinder.

15. A combination of the hydraulic lifting-lowering-system of claim 10, and a couch supported by the hydraulic cylinder.

* * * * *

UNITED STATES PATENT AND TRADEMARK OFFICE

CERTIFICATE OF CORRECTION

PATENT NO. : 6,272,853 B1
DATED : August 14, 2001
INVENTOR(S) : Ole Flemming Broechmann It is certified that error appears in the above-identified patent and that said Letters Patent is hereby corrected as shown below:

Title page,
Item [22], PCT date filed should read -- March 17, 1997. --

Signed and Sealed this

Seventh Day of May, 2002

*Attest:*

JAMES E. ROGAN

*Attesting Officer*

*Director of the United States Patent and Trademark Office*